A. E. OSBORN.
INTERNAL COMBUSTION ENGINE.
APPLICATION FILED MAR. 11, 1910.

1,011,480.

Patented Dec. 12, 1911.
5 SHEETS—SHEET 1.

Fig. 1,

WITNESSES:
F. B. Graves
J. S. Andrews Jr.

INVENTOR
Alden E. Osborn
BY
Chapin A. Rayford
his ATTORNEYS

A. E. OSBORN.
INTERNAL COMBUSTION ENGINE.
APPLICATION FILED MAR. 11, 1910.

1,011,480.

Patented Dec. 12, 1911.
6 SHEETS—SHEET 3.

WITNESSES:

INVENTOR
Alden E. Osborn
BY
his ATTORNEYS

A. E. OSBORN.
INTERNAL COMBUSTION ENGINE.
APPLICATION FILED MAR. 11, 1910.

1,011,480.

Patented Dec. 12, 1911.
5 SHEETS—SHEET 5.

Fig. 7,  Fig. 8,  Fig. 9,

WITNESSES:
F. B. Graves
S. Andrews Jr.

INVENTOR
Alden E. Osborn
BY
Chapin Raymond
his ATTORNEYS

UNITED STATES PATENT OFFICE.

ALDEN E. OSBORN, OF NEW YORK, N. Y.

INTERNAL-COMBUSTION ENGINE.

1,011,480. Specification of Letters Patent. Patented Dec. 12, 1911.

Application filed March 11, 1910. Serial No. 548,748.

*To all whom it may concern:*

Be it known that I, ALDEN E. OSBORN, a citizen of the United States of America, and a resident of New York, county and State of New York, have invented certain new and useful Improvements in Internal-Combustion Engines, of which the following is a specification, reference being had to the accompanying drawings, forming a part thereof.

My invention relates to improvements in internal combustion engines, and particularly to improvements in valve mechanism therefor.

Specifically this invention relates to a type of valve mechanism disclosed and claimed broadly by me in a copending application Serial Number 505,860, filed July 3, 1909, in which a valve chamber is provided having a distributing passage, a main valve therein for controlling it, and a concentric annular valve for alternately connecting the said distributing passage with inlet and ehaust connections.

My present invention consists first, in improved means for operating the valves comprising two eccentrics,—one positively connected with each of the two valves—and second in the disposition of the valve chamber in line with the working cylinder as an extension of the upper portion thereof.

My invention also consists in many novel details of construction and combinations of parts including means for operating the inlet and distributing valves of opposed cylinders from a single operating shaft, and means for preventing overheating of the valve chambers and valves; and in order that my invention may be thoroughly understood, I will now proceed to describe certain embodiments thereof, having reference to the accompanying drawings illustrating the same, and will then point out the novel features in claims.

Figure 1:
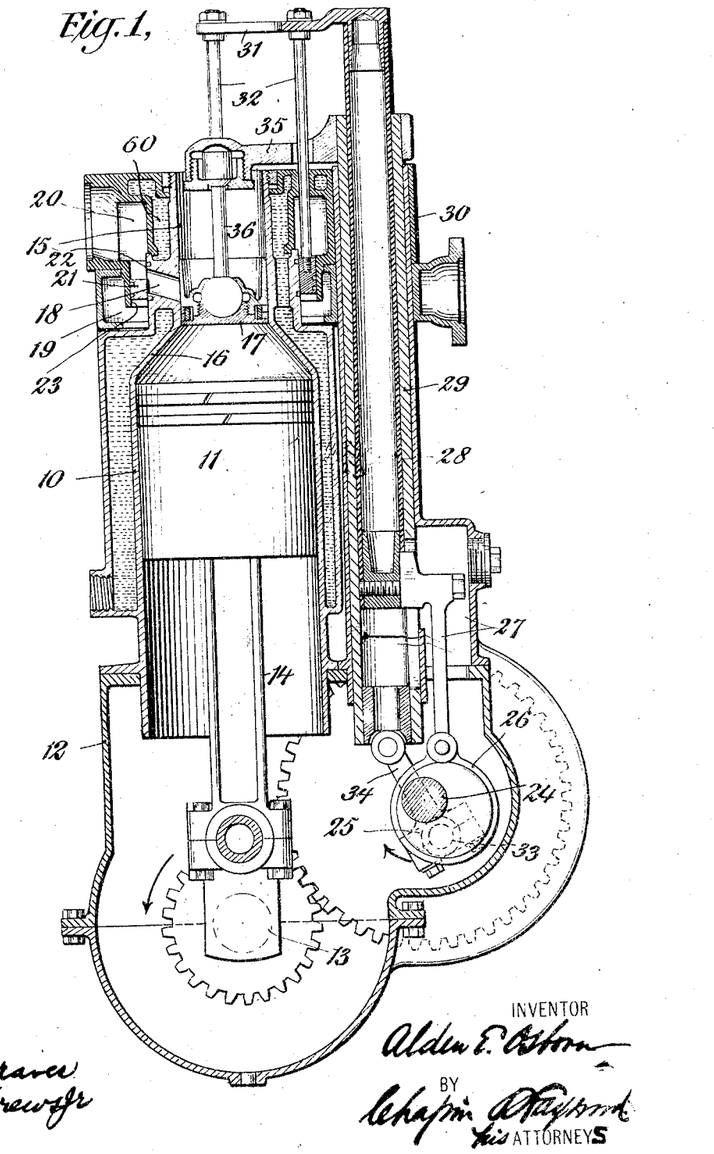
Figure 1 is a view in central longitudinal section through an internal combustion engine of the vertical type, constructed in accordance with my invention.

Referring first to the construction shown in Fig. 1 the engine comprises the usual working cylinder 10, a reciprocating piston 11 mounted therein, a crank casing 12 for supporting the cylinder, a crank shaft 13 journaled in the casing, and a connecting rod 14 for connecting the piston with the crank shaft. The upper end of the cylinder is provided with a cylindrical extension 15 of reduced diameter, the same being connected with the main cylinder 10 by a tapered reducing neck 16. The cylindrical extension 15 serves as a valve casing, a reciprocating slide valve 17 of the piston type being mounted therein. The said casing is provided with one or more openings 18 constituting a distributing passage, the inner or cylinder end of which is adapted to be controlled by the said valve 17, as will be well understood by reference to the drawings. In addition to the distributing passage the valve casing is provided with an inlet chamber 19 and an exhaust chamber 20, a tubular valve 21 being disposed between the said chambers and arranged in its longitudinal reciprocating to place either the inlet or the exhaust chamber into communication with the said distributing passage. As a matter of construction the said tubular valve is mounted between an outer face 22 with which the cylindrical extension 15 is provided and the inner face of the cylindrical element 23 which surrounds a portion of the cylindrical extension 15, and is connected therewith.

Movements of reciprocation are imparted to the main valve 17 and the distributing valve 21 by means of cranks or eccentrics disposed upon a valve operating shaft in the following manner: A shaft 24 suitably journaled in the casing is connected by gearing in the ordinary well known manner with the crank shaft 13, the ratio of the gearing being such as to impart one complete movement of revolution to the shaft 24 for each two complete movements of revolution of the shaft 13. The shaft 24 is provided with an eccentric 25 provided with an eccentric strap or connecting element 26 which is pivotally connected to an arm 27 upon a tubular slide 28 guided longitudinally in a second tubular slide 29 which is in turn guided to move longitudinally in a cylindrical guideway 30. The slide 28 is provided at its upper end with a cross-head 31, dependent rods 32 being provided for connecting the said cross-head with the tubular distributing valve 21. The shaft is provided with a second eccentric or crank pin 33 having a connecting rod 34 which connects the same with the second slide 29, the said slide being provided at its upper end with an operating arm 35 which extends over the end of the cylinder to the center thereof, and is connected at its extremity by means of a connecting rod 36 with the said main valve 17.

In the position in which the parts are set in Fig. 1 the engine is ready for a working stroke,—that is to say, a compressed charge is contained within the cylinder 10 at the upper end thereof above the piston 11. Upon the charge being ignited by suitable means (not shown) the engine piston 11 will be forced downward, the crank shaft being moved in the direction of the arrow there-against, the valve operating shaft 24 being revolved in the opposite direction as indicated by the arrow contiguous thereto. As the piston 11 continues to move downward the eccentric 25 will be rotated to move the distributing valve down so as to open the exhaust chamber 20 fully to the distributing passage 18. At the same time the crank pin or eccentric 33 will move upward so as to lift the main valve 17 until finally as the piston 11 approaches the bottom of its stroke the main valve 17 will reach a position wherein the distributing passage 18 will be open to the interior of the cylinder. Upon the return stroke of the piston 11 the inlet gases will be exhausted through the passage 18 to the exhaust chamber until as the piston again reaches its uppermost position, the crank shaft having completed one revolution, the continued movement of the crank shaft through one-half of a complete revolution will have lifted the distributing valve 21 to a point wherein it will cut off communication between the exhaust chamber and the distributing passage, and upon the commencement of the next downward movement of the piston the distributing valve 21 will be lifted so far as to open the distributing passage 18 to the inlet chamber 19. When the piston 11 was in its uppermost position just prior to its movement downward to take in a fresh charge, the eccentric or crank pin 33 will have moved around to a position to have lifted the main valve 17 to its uppermost position. This position is considerably above the distributing passage 18 so that upon the next downward movement of the piston 11 to draw in a fresh charge the ensuing downward movement of the main valve will not affect the closing of the passage 18. As the piston 11, however, reaches the lowermost portion of its stroke the piston valve 17 will have commenced to close the distributing passage so that as the piston 11 commences to rise again in its compression stroke, the valve 17 will have just reached a position wherein it will close the distributing passage 18. Thereafter the valve 17 will continue to move downward as the piston 11 moves upward, until as the piston 11 reaches its uppermost position the valve 17 will have just about reached its lowermost position, and the parts will be back in the position in which they are shown in Fig. 1 of the drawings. During this latter movement the distributing valve 21 will have been moved downward so as to again place the exhaust chamber 20 in communication with the distributing passage 18, but this will be immaterial so far as the operation of the engine is concerned because of the fact that the passage 18 is closed by the main valve 17. The cycle is now complete and ignition again taking place in the cylinder a fresh cycle will be commenced.

Figure 2:
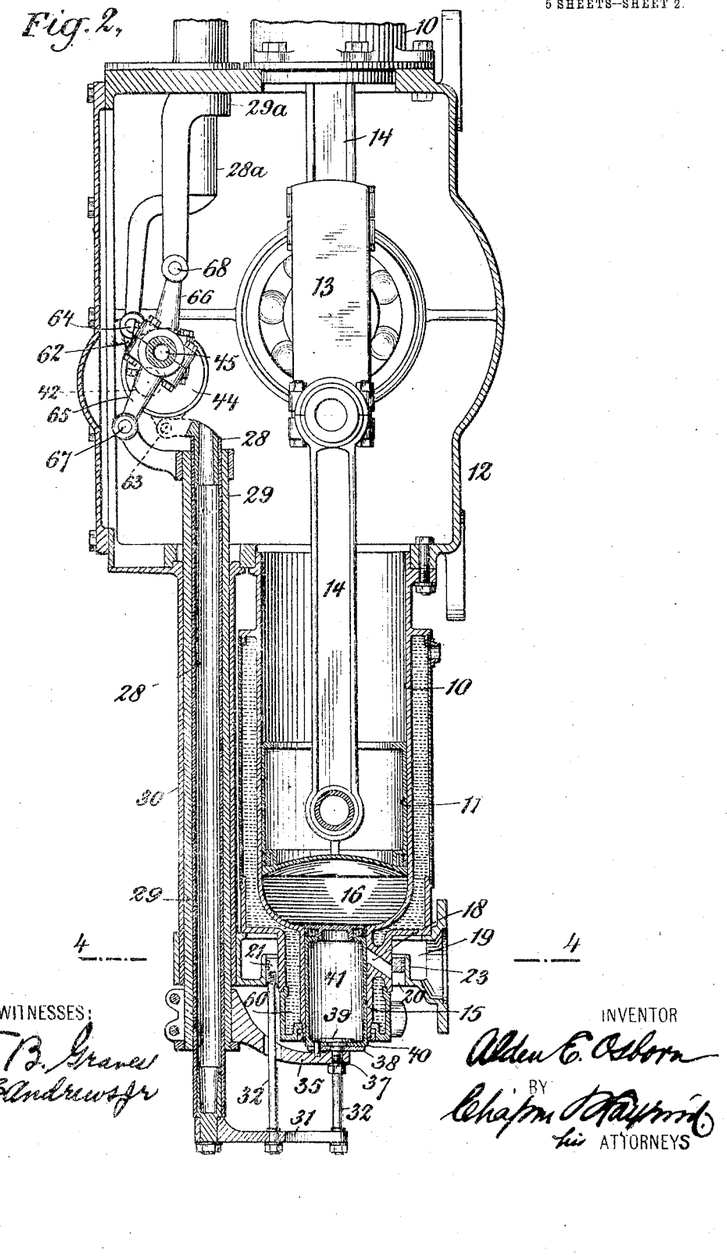
Fig. 2 is a view in central longitudinal section through a portion of a multicylinder engine of the horizontal opposed cylinder type constructed in accordance with my invention.
Figures 3, 4:
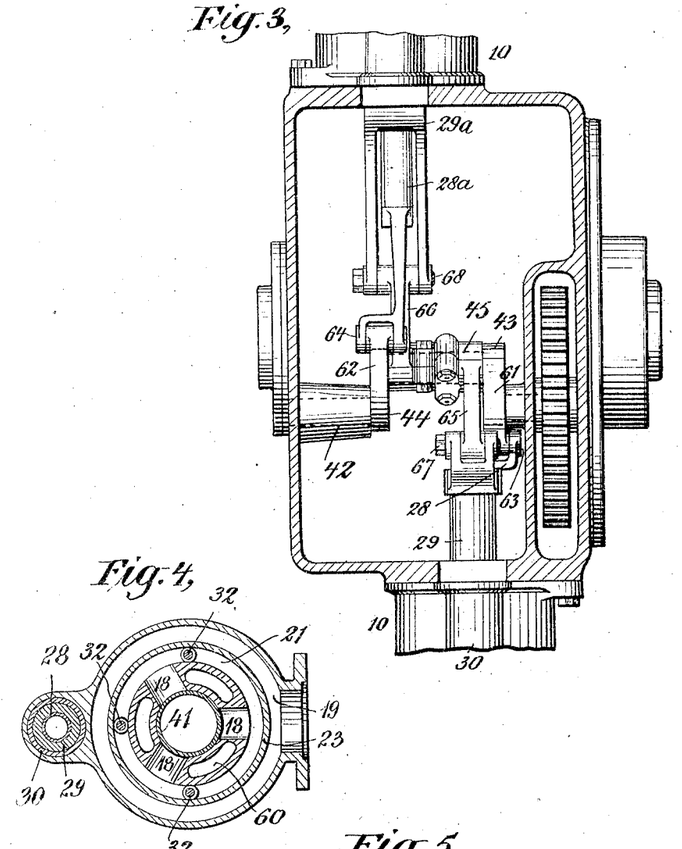
Fig. 3 is a view in horizontal section through the middle portion of the engine showing particularly the means for operating the valves.
Fig. 4 is a detail view in transverse section substantially upon the line 4—4 of Fig. 2.
Figure 5:
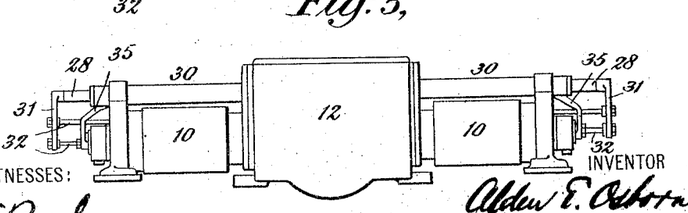
Fig. 5 is a view in side elevation of the complete engine.

It will be noted that the axis of the shaft 24 is out of line with the points of pivotal connection of the connecting elements 26 and 34 with the parts movable with the valves 21 and 17 respectively, the axis of the said shaft being actually disposed between the lines of movements of the said pivotal connections, and it will furthermore be noted that the eccentric or crank pin 33 is disposed angularly upon the shaft 24 in advance of the eccentric 25. This relationship of parts is a desirable one as producing the proper relative movements between the valves with respect to each other and with respect to the movements of the main piston 11. The effect of this arrangement of the parts and the relationship of the movements will be readily understood in the light of the later description of similar parts and the movements thereof, in respect to the engine shown in Fig. 2, and the diagrammatic views Figs. 7, 8, and 9.

In Figs. 2, 3, 4, and 5 I have shown the same valve mechanism as applied to an engine of the horizontal opposed cylinder type. In this instance I have shown certain modifications of the structure though in principle the method of operation is exactly the same. The arm 35 at the end of the sleeve 29 is provided with a stud 37, a plate 38, and a collar 39, the said plate and collar being in engagement with a flange 40 of a piston valve 41 corresponding to the piston valve 17 of the other figure, such parts being in lieu of the connecting rod 36 therein shown. The valve operating shaft 42, corresponding to the valve operating shaft 24 of the other figure, is provided with an eccentric 44 having two corresponding members for connection with the slides 28 and 28ª, and with a crank pin or eccentric 45 for connection with the tubular slides 29 and 29ª. The eccentrics 44—44 are provided with connecting elements 61—62 which are pivotally connected at 63 and 64 with the slides 28—28ª respectively, while the crank pin 45 is provided with connecting rods 65—66 which are pivotally connected at 67 and 68 with the slides 29—29ª respectively.

Figure 7:
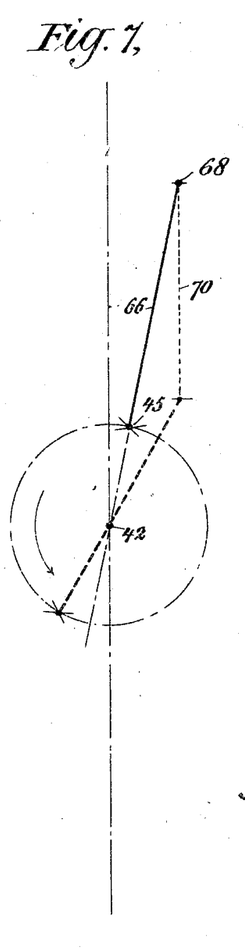
Figs. 7, 8 and 9 are diagrammatic views showing the relative positions of the cam operating shaft, the eccentrics thereon, and the parts reciprocated thereby, and illustrating the relative movements of the parts.
Figure 8:
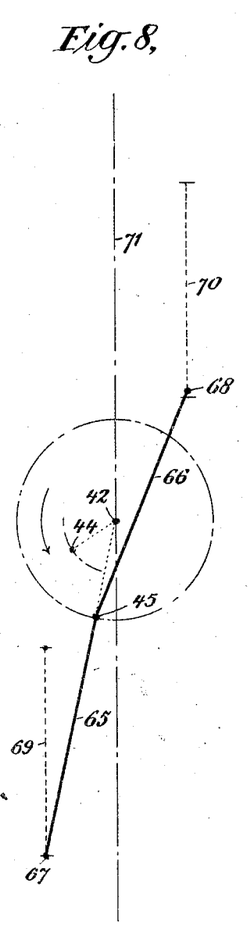
Figure 9:
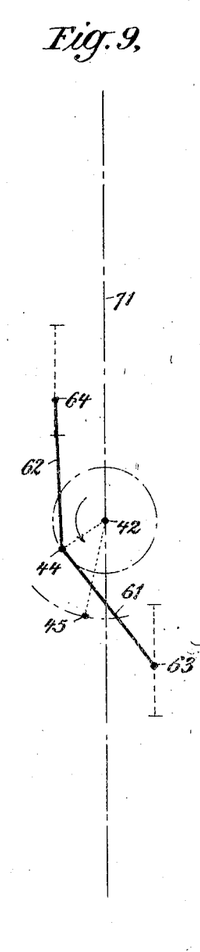

In Figs. 7, 8, and 9 I have shown diagrammatically the relationship of the valve operating shaft, the cranks or eccentrics, and the pivotal connection of the connecting elements with the parts to be moved thereby, together with the relative movements of the parts. In these views the rectilinear line of movement of the pivotal connections 67 and 68 are shown by dotted lines 69—70, and the said lines will be seen to be upon opposite sides of a line 71 which passes through the center of the shaft 42. The object of offsetting the parts is to obtain a quicker movement of the valve in one direction than in the other. By an examination of Fig. 7 it will be seen that a line which passes through the centers 68, 45 and 42 when the center 68 is in one extremity of its position, is oblique to a line passing through the three centers when the center 68 is at its opposite extremity. Hence the angular movement of the shaft is necessarily greater when the point 68 is being moved in one direction than while it is being moved in the other direction. As the conditions are reversed upon the opposite sides of the center of the engine, it then becomes necessary in order to employ but a single eccentric or crank 45, to cause the pivotal connection 68 to reciprocate upon opposite sides of the center of the crank shaft 42, or, in other words, to offset them oppositely. This will be readily understood by reference to the diagrammatic view in Fig. 8. In Fig. 7, I have shown but one of the connecting rods from the crank pin 45 in order to clearly bring out the relative movement of the parts, but in Fig. 8 I have shown both of the connecting rods in order to illustrate the relationship of movements between the parts upon opposite sides. Fig. 9 shows diagrammatically the relationship of the shaft 42 and the eccentric members 44 with respect to the pivotal centers 63 and 64 of the valve slides moved thereby. The points 63 and 64 are also arranged to move in lines parallel with, and upon opposite sides of, the central line 71, but in order to obtain the proper relationship of movement between the valves, the center 63 for the valve at one end of the engine moves in a line upon opposite sides of the line 71 to that in which the center 67 for the other valve upon the same side of the engine moves. The effect of this is, of course, to compel the movement of one of the valves for either cylinder faster in one direction than the other, and the movement of the other valve for the same cylinder relatively faster in the opposite direction. The two diagrams 8 and 9 may be read one with the other,—that is to say, the parts are in the same relative positions in both views, and the views may be superposed; they are merely separated for the purposes of illustration. It will also be noted that the two eccentrics or cranks are arranged the one angularly in advance of the other. I find that a convenient position is 45 degrees apart, and I also find it convenient to make the throw of one of the cranks or eccentrics much greater than the other,—preferably the one about twice as great as the other. It will, of course, be understood that the foregoing may be departed from within wide limits and is illustrative merely of the preferred form, construction, and arrangement of the parts.

Figure 6:
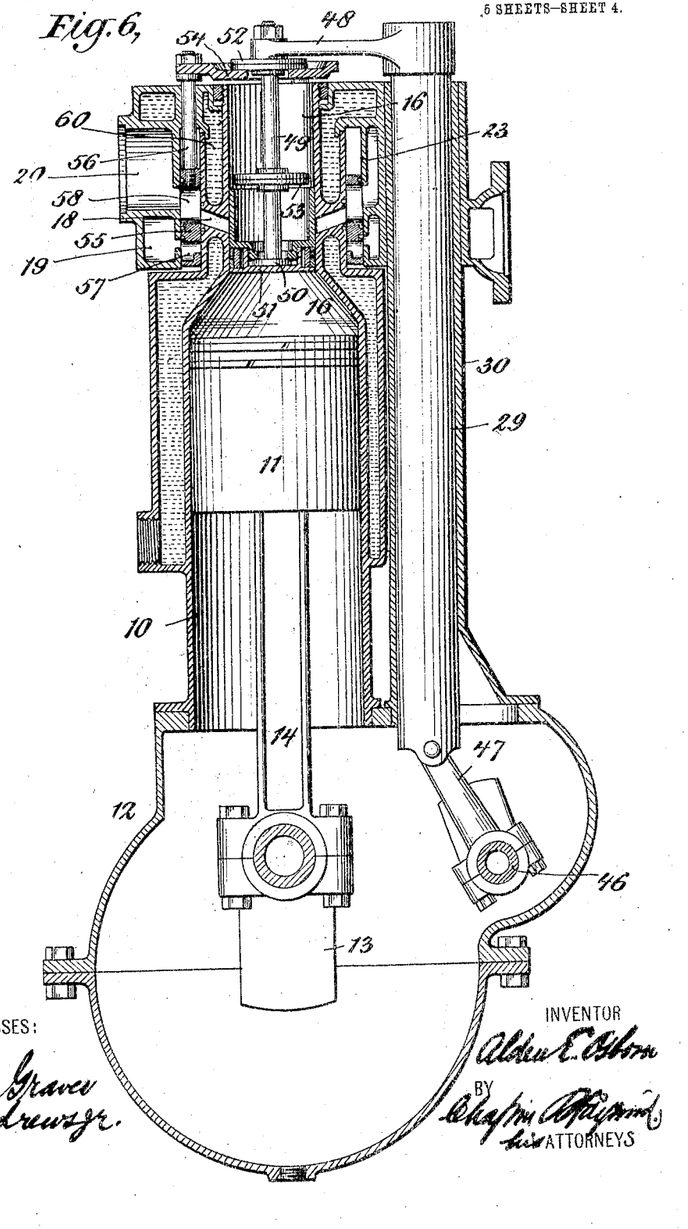
Fig. 6 is a view in central longitudinal section through a vertical type of internal combustion engine showing the same as equipped with a modified form of the valve mechanism.

In Fig. 6 I have shown a type of engine similar to that shown in Fig. 1, except that I have provided means for moving the distributing valve by, and in accordance with, the movement of the main valve near the opposite ends of its stroke, and in this case I have employed but a single eccentric or crank pin 46 upon the valve operating shaft, corresponding to the eccentric or crank pin 33 in the construction shown in Fig. 1, or the eccentric or crank pin 45 in the construction of Figs. 2 to 5 inclusive, the same being provided with a connecting rod 47 for connecting it with the main valve slide 29. At its upper end the slide is provided with an arm 48 which carries at the end thereof at a point concentric with the axis of the main cylinder 10, a dependent rod 49 rigidly secured thereto. At its lower end the rod is provided with a collar 50 which is connected to the main valve 51 corresponding to the main valve 17 of the construction shown in Fig. 1 and the main valve 41 of the construction shown in Figs. 2 to 5, the connection being of such character as to permit some lateral movement whereby to prevent binding of the parts. Intermediate its ends the said rod 49 is provided with two collars 52—53, the said collars being adapted to engage a head 54 connected to the tubular distributing valve 55 by means of rods 56. The collars 53 are so positioned that they will engage the said head near the end of the stroke of the valve 51 to quickly move the valve 55 the same being designed to move the entire limit of its movement in either direction after the head 54 has been engaged by either the collar 52—53, and during the completion of the movement of the main valve thereafter. The distributing valve 55 in the embodiment of my invention shown in Fig. 6, is provided with an inlet passage 57 for connecting the distributing passage 18 with the inlet chamber 19 in one position of the valve, and with another passage 58 for placing the said distributing passage 18 in communication with the exhaust chamber 20 in the opposite position of the said valve. The main valve is timed to be moved by the valve operating shaft in a manner similar to that described for the construction of Fig. 1, the only essential difference between the operation of this construction and that of Fig. 1 being that the distributing valve will be held stationary during the greater portion of the movement of the main valve, and thereafter moved by the main valve as it reaches the extremity of its movement in either direction. Thus, as the valve 51 moves all the way up it will finally carry the distributing valve up with it so that as the piston 11 moves downward in its stroke to draw in a new charge, the distributing passage will be connected with the inlet chamber. It will remain in such connection after the main valve has moved downward to close the distributing passage, while the piston 11 moves upward to compress the charge, the movement of the distributing valve being reversed so as to again connect the distributing passage 18 with the exhaust chamber as the main valve completes its downward movement while the charge is being compressed, the passage 18 being open to the exhaust chamber but closed to the working cylinder by the main valve during the next working stroke of the piston 11.

In the several constructions shown it will be noted that the cylindrical chamber containing the main valve and the concentric annular chamber which contains the distributing valve are separated by a space which forms an annular chamber 60 through which a cooling medium is circulated. This space is conveniently in open communication with the chamber inclosed by the water jacket of the cylinder, as will be well understood. Such an arrangement is important as it prevents the heat generated within the working cylinder from injuriously affecting the distributing valve.

What I claim is:

1. An internal combustion engine comprising a working cylinder provided with an extension in line therewith at its upper end constituting a main valve chamber and having an annular valve chamber surrounding the same, and a distributing passage connecting them, a main valve mounted within the first said chamber for controlling the inner end of the said distributing passage, an annular valve mounted in the second said valve chamber for controlling the outer end of the said distributing passage, and means for operating the valves.

2. In an internal combustion engine, the combination with a working cylinder, a main valve chamber formed in line therewith and as an extension of the upper end thereof, an annular valve chamber surrounding the main valve chamber, an inlet chamber, and an exhaust chamber, and having a distributing passage between the said main and distributing valve chambers, of a main valve mounted within the first said valve chamber for controlling the cylinder end of the distributing passage, an annular distributing valve mounted in the annular chamber arranged to alternately connect the said distributing passage with the said inlet and exhaust chambers, and means for operating the valves.

3. In an internal combustion engine, the combination with a working cylinder provided with a cylindrical extension of reduced diameter at the upper end thereof constituting a valve chamber, an annular valve chamber concentrically surrounding the first said valve chamber, and a distributing passage disposed between the two said valve chambers, of a piston valve mounted in the first said valve chamber for controlling the cylinder end of the discharge passage, an annular distributing valve mounted in the second said valve chamber for controlling the opposite end of the said distributing passage, and means for operating the valves.

4. Valve mechanism comprising a casing having inlet and exhaust chambers, and a stationary tubular member containing a distributing passage therethrough, a piston valve within the said tubular casing member for controlling the inner end of the said distributing passage, an annular valve surrounding the said tubular member, for connecting the distributing passage with either the said inlet or exhaust chambers, a valve operating shaft, eccentrics upon the said shaft, and means for connecting the said eccentrics with the said valves respectively.

5. Valve mechanism comprising a casing having inlet and exhaust chambers, and a stationary tubular member containing a distributing passage therethrough, a piston valve within the said tubular casing member for controlling the inner end of the said distributing passage, an annular valve surrounding the said tubular member, for connecting the distributing passage with either the said inlet or exhaust chambers, a valve operating shaft, eccentrics upon the said shaft, the one set angularly in advance of the other, and means for connecting the said eccentrics with the said valves respectively.

6. Valve mechanism comprising a casing having inlet and exhaust chambers, and a stationary tubular member containing a distributing passage therethrough, a piston valve within the said tubular casing member for controlling the inner end of the said distributing passage, an annular valve surrounding the said tubular member, for connecting the distributing passage with either the said inlet or exhaust chambers, a valve operating shaft, eccentrics upon the said shaft, the one set angularly in advance of, and having a greater throw than, the other, and means for connecting the said eccentrics with the said valves respectively.

7. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber for controlling the inner end of the said distributing passage, a valve mounted in the second said valve chamber for controlling the outer end of the said distributing passage, a valve operating shaft, eccentrics upon the said shaft, and means for connecting the said eccentrics with the said valves respectively.

8. An internal combustion engine comprising a working cylinder provided with an extension in line therewith at its upper end constituting a main valve chamber and having an annular valve chamber surrounding the same, and a distributing passage connecting them, a main valve mounted within the said first chamber for controlling the inner end of the said distributing passage, an annular valve mounted in the second said valve chamber for controlling the outer end of the said distributing passage, a valve operating shaft, eccentrics upon the said shaft, and means for connecting the said eccentrics with the said valves respectively.

9. In an internal combustion engine, the combination with a working cylinder, a main valve chamber formed in line therewith and as an extension of the upper end thereof, another valve chamber arranged outside the first said valve chamber, an inlet chamber, and an exhaust chamber, and having a distributing passage between the main and the distributing valve chambers, of a main valve within the first said valve chamber for controlling the cylinder end of the distributing passage, a valve mounted in the second said valve chamber for controlling the opposite end of the said distributing passage, a valve operating shaft, eccentrics upon the said shaft, and means for connecting the said eccentrics with the said valves respectively.

10. In an internal combustion engine, the combination with a working cylinder, a main valve chamber formed in line therewith and as an extension of the upper end thereof, an annular valve chamber surrounding the main valve chamber, an inlet chamber, and an exhaust chamber, and having a distributing passage between the said main and distributing valve chambers, of a main valve mounted within the first said valve chamber for controlling the cylinder end of the distributing passage, an annular distributing valve mounted in the annular chamber arranged to alternately connect the said distributing passage with the said inlet and exhaust chambers, a valve operating shaft, eccentrics upon the said shaft, and means for connecting the said eccentrics with the said valves respectively.

11. In an internal combustion engine, the combination with a working cylinder provided with a cylindrical extension of reduced diameter at the upper end thereof constituting a valve chamber, a second valve chamber arranged outside the first said valve chamber, and a distributing passage between them, of a piston valve mounted in the first said valve chamber for controlling the cylinder end of the distributing passage, a valve mounted in the second said valve chamber for controlling the opposite end of the said distributing passage, a valve operating shaft, eccentrics upon the said shaft, and means for connecting the said eccentrics with the said valves respectively.

12. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber for controlling the inner end of the said distributing passage, a valve mounted in the second said valve chamber for controlling the outer end of the said distributing passage, a valve operating shaft, eccentrics upon the said shaft, the one being disposed upon the shaft angularly in advance of the other, and means for connecting the said eccentrics with the said valves respectively.

13. An internal combustion engine comprising a working cylinder provided with an extension in line therewith at its upper end constituting a main valve chamber and having an annular valve chamber surrounding the same, and a distributing passage connecting them, a main valve mounted within the first said chamber for controlling the inner end of the said distributing passage, an annular valve mounted in the second said valve chamber for controlling the outer end of the said distributing passage, a valve operating shaft, eccentrics upon the said shaft, the one being disposed upon the shaft angularly in advance of the other, and means for connecting the said eccentrics with the said valves respectively.

14. In an internal combustion engine, the combination with a working cylinder, a main valve chamber formed in line therewith and as an extension of the upper end thereof, another valve chamber arranged outside the first said valve chamber, an inlet chamber, and an exhaust chamber, and having a distributing passage between the main and the distributing valve chambers, of a main valve within the first said valve chamber for controlling the cylinder end of the distributing passage, a valve mounted in the second said valve chamber for controlling the opposite end of the said distributing passage, a valve operating shaft, eccentrics upon the said shaft, the one being disposed upon the shaft angularly in advance of the other, and means for connecting the said eccentrics with the said valves respectively.

15. In an internal combustion engine, the combination with a working cylinder, a main valve chamber formed in line therewith and as an extension of the upper end thereof, an annular valve chamber surrounding the main valve chamber, an inlet chamber, and an exhaust chamber, and having a distributing passage between the said main and distributing valve chambers, of a main valve mounted within the first said valve chamber for controlling the cylinder end of the distributing passage, an annular distributing valve mounted in the annular chamber arranged to alternately connect the said distributing passage with the said inlet and exhaust chambers, a valve operating shaft, eccentrics upon the said shaft, the one being disposed upon the shaft angularly in advance of the other, and means for connecting the said eccentrics with the said valves respectively.

16. In an internal combustion engine, the combination with a working cylinder provided with a cylindrical extension of reduced diameter at the upper end thereof constituting a valve chamber, a second valve chamber arranged outside the first said valve chamber, and a distributing passage between them, of a piston valve mounted in the first said valve chamber for controlling the cylinder end of the distributing passage, a valve mounted in the second said valve chamber for controlling the opposite end of the said distributing passage, a valve operating shaft, eccentrics upon the said shaft, the one being disposed upon the shaft angularly in advance of the other, and means for connecting the said eccentrics with the said valves respectively.

17. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber for controlling the inner end of the said distributing passage, a valve mounted in the second said valve chamber for controlling the outer end of the said distributing passage, two vertically guided slides arranged parallel to the said cylinder, means connecting the two said slides with the two said valves respectively, a valve operating shaft, two eccentrics thereon, and means connecting the two eccentrics to the two said slides respectively.

18. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber, for controlling the inner end of the said distributing passage, a valve mounted in the second said valve chamber for controlling the outer end of the said distributing passage, two vertically guided slides arranged parallel to the said cylinder, means connecting the two said slides with the two said valves respectively, a valve operating shaft, two eccentrics thereon, the one arranged angularly in advance of the other, and means connecting the two eccentrics to the two said slides respectively.

19. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber for controlling the inner end of the said distributing passage, a valve mounted in the second said valve chamber for controlling the outer end of the said distributing passage, two vertically guided slides arranged parallel to the said cylinder, means connecting the two said slides with the two said valves respectively, a valve operating shaft, two eccentrics thereon, the one having a greater throw than the other, and means connecting the two eccentrics to the two said slides respectively.

20. An internal combustion engine comprising a working cylinder provided with an extension in line therewith at its upper end constituting a main valve chamber, and having another valve chamber arranged outside the first said valve chamber, and a distributing passage connecting the said valve chambers, a main valve mounted within the first said chamber for controlling the inner end of the said distributing passage, a valve mounted in the second said valve chamber for controlling the outer end of the said distributing passage, two vertically guided slides arranged parallel to the said cylinder, means connecting the two said slides with the two said valves respectively, a valve operating shaft, two eccentrics thereon, the one having a greater throw than, and arranged angularly in advance of, the other, and means connecting the two eccentrics to the two said slides respectively.

21. In an internal combustion engine, the combination with a working cylinder, a main valve chamber formed in line therewith and as an extension at the upper end thereof, another valve chamber arranged outside the first said valve chamber, a chamber between the said valve chambers through which a cooling medium may be circulated, an inlet chamber, and an exhaust chamber, and having a distributing passage between the main and the distributing valve chambers, of a main valve within the first said valve chamber for controlling the cylinder end of the distributing passage, a valve mounted in the second said valve chamber for controlling the opposite end of the said distributing passage, and means for operating the valves.

22. In an internal combustion engine, the combination with a working cylinder, a main valve chamber formed in line therewith and as an extension at the upper end thereof, an annular valve chamber surrounding the main valve chamber, a chamber between the said valve chambers through which a cooling medium may be circulated, an inlet chamber, and an exhaust chamber, and having a distributing passage between the said main and distributing valve chambers, of a main valve mounted within the first said valve chamber for controlling the cylinder end of the distributing passage, an annular distributing valve mounted in the annular chamber arranged to alternately connect the said distributing passage with the said inlet and exhaust chambers, and means for operating the valves.

23. In an internal combustion engine, the combination with three concenric chambers, and a passage through the intermediate chamber for connecting the interior chamber with the exterior chamber the intermediate chamber being arranged to receive a cooling medium, of a valve in the interior chamber for controlling the inner end of the said passage, a valve in the exterior chamber for controlling the outer end of the said passage, and means for operating the valves.

24. In an internal combustion engine, the combination with three concentric chambers, and a passage through the intermediate chamber for connecting the interior chamber with the exterior chamber, the intermediate chamber being arranged to receive a cooling medium, of a valve in the interior chamber for controlling the inner end of the said passage, a valve in the exterior chamber for controlling the outer end of the said passage, a valve operating shaft, eccentrics upon the said shaft, and means for connecting the said eccentrics with the said valves respectively.

25. In an internal combustion engine, the combination with a cylinder and two valves therefor, of a valve operating shaft, two eccentrics thereon, and connecting elements upon the said eccentrics pivotally connected to parts movable with the said valves, the lines of movement of the said pivotal connections being substantially parallel with, and upon opposite sides of, a line passing through the axial center of the said shaft.

26. In an internal combustion engine the combination with a cylinder and two valves therefor, of a valve operating shaft, two eccentrics thereon, and connecting elements upon the said eccentrics pivotally connected to parts movable with the said valves, the lines of movement of the said pivotal connections being substantially parallel with, and upon opposite sides of, a line passing through the axial center of the said shaft, one of the eccentrics being set angularly upon the shaft in advance of the other.

27. In an internal combustion engine the combination with a cylinder and two valves therefor, of a valve operating shaft, two eccentrics thereon, and connecting elements upon the said eccentrics pivotally connected to parts movable with the said valves, the lines of movement of the said pivotal connections being substantially parallel with, and upon opposite sides of, a line passing through the axial center of the said shaft, one of the said eccentrics having a greater throw than the other, and the eccentric having the greater throw being set upon the shaft angularly in advance of the eccentric having the smaller throw.

28. Valve mechanism comprising a casing having inlet and exhaust chambers, and a distributing passage, a valve for controlling the said passage, a second valve for connecting the said passage with either the said inlet or the said exhaust chamber, a valve operating shaft, two eccentrics upon the shaft, connecting elements upon the said eccentrics pivotally connected to parts movable with the said valves, the lines of movement of the said pivotal connections being substantially parallel with, and upon opposite sides of, a line passing through the axial center of the said shaft.

29. Valve mechanism comprising a casing having inlet and exhaust chambers, and a tubular member containing a distributing passage therethrough, a piston valve within the said tubular casing member for controlling the inner end of said distributing passage, an annular valve surrounding the said tubular member for connecting the distributing passage with either the said inlet or exhaust chamber, a valve operating shaft, two eccentrics thereon, and connecting elements upon the said eccentrics pivotally connected to parts movable with the said valves, the lines of movement of the said pivotal connections being substantially parallel with, and upon opposite sides of, a line passing through the axial center of the said shaft.

30. In an internal combustion engine, the combination with a cylinder and two valves therefor, and a reciprocating element connected with each of the said valves, of operating means therefor comprising a rotating shaft, two eccentrics thereon, and connecting elements between the eccentrics and the reciprocating elements respectively, the axis of the said shaft being so located with respect to the said reciprocating elements as to cause each of the said reciprocating elements to move faster in one direction than in the other, the relatively rapid movement of one of the said reciprocating elements being in the opposite direction to that of the other.

31. In an internal combustion engine, the combination with a cylinder and two valves therefor, and a reciprocating element connected with each of the said valves, of operating means therefor comprising a rotating shaft, two eccentrics thereon, and connecting elements between the eccentrics and the said reciprocating elements respectively, the axis of the said shaft being so located with respect to the said reciprocating elements that the said shaft will have a greater angular movement when moving each of the said elements in one direction than when moving them in the other, the angular movement being the greater when moving one of the said elements in one direction and the other of the said elements in the other direction.

32. Valve mechanism comprising a casing having inlet and exhaust chambers, and a distributing passage, a valve for controlling the said passage, a second valve for connecting the said passage with either the said inlet or the said exhaust chamber, a valve operating shaft, eccentrics upon the said shaft, and means for connecting the said eccentrics with the said valves respectively, the axis of the said shaft being so disposed with relation to the parts moved thereby as to cause each of the said valves to move faster in one direction than in the other, the more rapid movement of the one valve being in the opposite direction to that of the other.

33. Valve mechanism comprising a casing having inlet and exhaust chambers, and a tubular member containing a distributing passage therethrough, a piston valve within the said tubular casing member for controlling the inner end of the said distributing passage, an annular valve surrounding the said tubular member for connecting the said distributing passage with either the said inlet or exhaust chambers, a valve operating shaft, eccentrics upon the said shaft, means for connecting the said eccentrics with the said valves respectively, the axis of the said shaft being so disposed with respect to the parts moved thereby as to cause each of the said valves to move faster in one direction than in the other, the more rapid movement of the one valve being in the opposite direction to that of the other.

34. Valve mechanism comprising a casing having inlet and exhaust chambers, and a distributing valve, a valve for controlling the said passage, a second valve for connecting the said passage with either the said inlet or the said exhaust chamber, a valve operating shaft, eccentrics upon the said shaft, and means for connecting the said eccentrics with the said valves respectively, the axis of the said shaft being so located with respect to the parts moved by the said eccentrics that the said shaft will have a greater angular movement when moving each of the said valves in one direction than when moving them in the other, the angular movement of the said shaft being the greater when moving one of the said valves in one direction and when moving the other of the said valves in the other direction.

35. Valve mechanism comprising a casing having inlet and exhaust chambers, and a tubular member containing a distributing passage therethrough, a piston valve within the said tubular casing member for controlling the inner end of the said distributing passage, an annular valve surrounding the said tubular member, for connecting the distributing passage with either the said inlet or exhaust chambers, a valve operating shaft, eccentrics upon the said shaft, and means for connecting the said eccentrics with the said valves respectively, the axis of the said shaft being so disposed with respect to the parts moved thereby that the said shaft will have a greater angular movement when moving each of the said valves in one direction than when moving them in the other, the angular movement of the said shaft being the greater when moving one of the valves in one direction and when moving the other of the said valves in the other direction.

36. In an internal combustion engine, the combination with opposed cylinders and a valve for each of them, of a valve operating shaft, an eccentric thereon, connecting elements upon the said eccentric pivotally connected to parts movable with the two said valves, the points of the two pivotal connections being disposed upon opposite sides of the said shaft, whereby the movements thereof will be in lines substantially parallel with, but upon opposite sides of, a line passing through the axial center of the said shaft.

37. In an internal combustion engine, the combination with opposed cylinders and a valve for each of them, of a valve operating shaft, an eccentric thereon, connecting elements upon the said eccentric pivotally connected to parts movable with the two said valves, the axis of the said shaft being so located with respect to the points of pivotal connections of the connecting elements with the said parts movable with the valves, whereby the movements of the said pivotal connections toward and away from the said shaft will be correspondingly faster in the one direction than in the other.

38. In an internal combustion engine, the combination with opposed cylinders and a valve for each of them, of a valve operating shaft, an eccentric thereon, connecting elements upon the said eccentric pivotally connected to parts movable with the two said valves, the axis of the said shaft being so located with respect to the points of pivotal connections of the connecting elements with the said parts movable with the valves, whereby the angular advance of the shaft when moving each of the said valves in a corresponding direction, will be greater than when moving the said valves in the opposite direction.

39. In an internal combustion engine, the combination with opposed cylinders and two valves for each of the cylinders, of a single valve operating shaft, two eccentrics thereon, each eccentric arranged to operate two of the corresponding valves, one for each of the cylinders, connecting elements upon the said eccentrics pivotally connected to parts movable with the said valves, the axis of the said shaft being so disposed with respect to the said pivotal connections that each of the said pivotal connections will move faster in one direction than in the other, the movements of the said connections for the valves for one cylinder being the faster in opposite directions, and the movement of the two connections for the valves of opposite cylinders being the faster in opposite directions, whereby the relative movements of the valves for the opposite cylinders will correspond.

In witness whereof, I have hereunto set my hand this 8th day of March, 1910.

ALDEN E. OSBORN.

Witnesses:
D. HOWARD HAYWOOD,
LYMAN S. ANDREWS, Jr.